United States Patent Office — 3,123,578, Patented Mar. 3, 1964

3,123,578
ALDEHYDE-MODIFIED ALKYD RESINS AND
THEIR PRODUCTION
William M. Kraft, Verona, N.J., assignor to Heyden Newport Chemical Corporation, New York, N.Y., a corporation of Delaware
No Drawing. Filed Dec. 3, 1959, Ser. No. 856,933
26 Claims. (Cl. 260—22)

The present invention relates to alkyd resins and to their production. More particularly it relates to novel modified alkyd resins having unusual properties and to the production of such resins.

Alkyd resins, which are polymeric esters resulting from the condensation of a polyhydric alcohol with a polycarboxylic acid and a monocarboxylic acid, are widely used in the manufacture of decorative, protective, and functional surface-coating compositions. While alkyd resins are generally characterized by good drying properties, outdoor durability and resistance to water and to alkalies, the properties of a particular alkyd resin are dependent to a large extent upon the ratios of reactants used in its preparation. An alkyd resin which contains a relatively large amount of polycarboxylic acid is classified as a short oil resin and is characterized by fast drying to hard, durable films, while an alkyd resin which contains a relatively small amount of polycarboxylic acid is classified as a long oil resin and dries more slowly to relatively soft, flexible films. Medium oil alkyd resins have properties that fall between those of the short oil and the long oil alkyd resins.

In the finishing of such metal products as automobiles and electrical appliances where rapid drying to hard, glossy, chemical-resistant films is of prime importance, short oil and medium oil alkyds prepared from glycerol and certain other polyhydric alcohols and combinations of these alkyd resins with styrene are widely used. Short oil and medium oil alkyd resins prepared from pentaerythritol and the polypentaerythritols have therefore generally been unsatisfactory for use in fast-drying metal finishes. Because of the high functionality of the systems, these alkyd resins tend to gel before a product having a low acid number can be obtained.

The present invention relates to a modification of short oil and medium oil alkyd resins prepared from pentaerythritol and other neopentyl polyhydric alcohols which overcomes the difficulties heretofore experienced when these alkyd resins were used in the formulation of fast-drying metal finishes and which yields products superior in many respects to previously known alkyd resins and styrenated alkyd resins. It has been found that a number of improvements in the properties of alkyd resins prepared from pentaerythritol and other neopentyl alcohols result from the modification of the resins with an aldehyde. While this modification is of particular importance when applied to short oil and medium oil alkyd resins, it may also be used to improve the properties of long oil alkyd resins prepared from these polyhydric alcohols.

Because they can be brought to a low acid number without danger of gelation and because they dry rapidly to hard, flexible, durable films, the novel aldehyde-modified short oil and medium oil alkyd resins are useful in a wide variety of pigmented and clear metal finishes.

The aldehyde-modified alkyd resins of the present invention are characterized by unusual and desirable drying properties. These resins dry more rapidly than do comparable unmodified products prepared from glycerol and certain other polyhydric alcohols and reach their ultimate hardness in a shorter period of time. This combination of drying properties makes it possible to apply a second coat of the metal finish within 24 hours without damage to the first coat. As compared with the alkyd resins previously used in metal finishes, the aldehyde-modified alkyd resins of the present invention are also characterized by higher viscosity, greater film hardness, improved flexibility, and better resistance to water and to alkalies.

The aldehyde-modified alkyd resins of the present invention may be prepared from well-known alkyd resin ingredients. The polyhydric alcohols which may be used in the practice of the invention are those that contain a neopentyl nucleus and that have from 3 to 8 hydroxyl groups. These alcohols have the structure

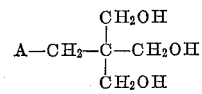

wherein A represents a hydrogen atom, a lower alkyl group a hydroxyl group

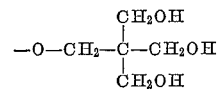

or

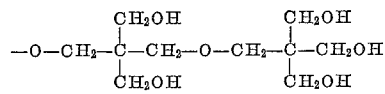

Illustrative of these polyhydric alcohols are pentaerythritol, dipentaerythritol, tripentaerythritol, trimethylolethane, trimethylolpropane, trimethylolbutane, and trimethylolhexane. Mixtures of two or more of these polyhydric alcohols may be used. The preferred polyhydric alcohol is pentaerythritol.

A wide variety of polycarboxylic compounds may be used in the preparation of the novel alkyd resins. These include saturated and unsaturated aliphatic polycarboxylic acids, alicyclic polycarboxylic acids, and aromatic polycarboxylic acids as well as the anhydrides of these acids. Specific examples of these acids include succinic acid, citric acid, citraconic acid, maleic acid, chloromaleic acid, phthalic acid, chlorophthalic acids, tetrahydrophthalic acid, trimellitic acid, and pyromellitic acid. Also useful are the Diels-Alder reaction products of maleic anhydried and a conjugated diene including, for example, terepene maleic anhydride adducts, cyclopentadiene- and chlorocyclopentadiene-maleic anhydride adducts, and the like. A single polycarboxylic compound or a mixture of these compounds may be used. The preferred polycarboxylic compounds are phthalic anhydride and maleic anhydride.

Any aldehyde that will react with the aforementioned polyhydric alcohols to form acetals may be used in the preparation of the aldehyde-modified alkyd resins. The aldehyde may be a saturated or unsaturated aliphatic aldehyde, or an aromatic aldehyde, an aralkyl aldehyde, an alkaryl aldehyde, or a heterocyclic aldehyde. These aldehydes may be represented by the structural formula R—CHO, wherein R represents a hydrogen atom, an alkyl group or substituted alkyl group containing from 1 to 11 carbon atoms, an aralkyl group, an alkaryl group, an alkenyl group, an aryl or substituted aryl group, a heterocyclic group, and the like. Illustrative of these aldehydes are the following: formaldehyde, acetaldehyde, chloral, propionaldehyde, acetoxypropionaldehyde, butyraldehyde, isobutyraldehyde, valeraldehyde, 2-ethylbutyraldehyde, heptaldehyde, 2-ethylhexaldehyde, lauraldehyde, furfural, acrolein, methacrolein, crotonaldehyde, 2-ethyl-3-propyl-acrolein, glyoxal, pyruvic aldehyde, benzaldehyde, chlorobenzaldehyde, nitrobenzaldehyde, aminobenzaldehyde, dimethylbenzaldehyde, piperonal, salicylaldehyde, anisaldehyde, cinnamaldehyde, and the like. In addition polymers of these aldehydes, such as paraformaldehyde, trioxane, and paraldehyde, may be used. Also useful are those compounds, such as hexamethylenetetramine, that liberate an aldehyde during the course of the reaction.

Among the monocarboxylic acids that may be used in the preparation of the products of this invention are aliphatic straight or branched chain acids which contain from 4 to 22 carbon atoms. These acids may be saturated or may have ethylenic unsaturation. Also useful are mononuclear aromatic monocarboxylic acids. Illustrative of these acids are butyric acid, valeric acid, 2-ethylbutyric acid, 2-ethylhexanoic acid, lauric acid, myristic acid, stearic acid, arachidic acid, behenic acid, oleic acid, acrylic acid, methacrylic acid, crotonic acid, sorbic acid, linoleic acid, abietic acid, phenylacetic acid, benzoic acid, chlorobenzoic acid, toluic acid, salicyclic acid, p-t-butylbenzoic acid, and cresotic acid. A single monocarboxylic acid or a mixture of these acids may be used. For example, drying oil fatty acids and semi-drying oil fatty acids, which are mixtures of monocarboxylic acids, are useful in the preparation of these alkyd resins. These include linseed oil fatty acids, soybean oil fatty acids, tall oil fatty acids, cottonseed oil fatty acids, dehydrated castor oil fatty acids, tung oil fatty acids, and the like.

The components of the alkyd resin, namely the polyhydric alcohol, the aldehyde, the polycarboxylic acid, and the monocarboxylic acid, may be used in widely varying proportions depending to a certain extent upon the properties desired and the reactants employed. In discussing the proportions used it is to be understood that the proportions are based on molar proportions and are expressed as moles of acid or aldehyde per mole of polyhydric alcohol. In describing the relative amounts of material reacted it is considered that all of the aldehyde and all of the acids enter into the reaction and that at least part of the alcohol reacts completely. The amount of alcohol that is regarded as reacting completely is the amount required stoichiometrically to react with all of the acid and aldehyde. Any polyhydric alcohol present in addition to this amount is considered for purposes of calculation as not reacting but rather being an unreacted excess. Some excess polyhydric alcohol is usually used in the preparation of the novel alkyd resins. The amount of excess polyhydric alcohol may vary from about 1% to 50% and in most instances will be in the range of 1% to 20%.

The amount of aldehyde employed in the preparation of the modified alkyd resins is approximately the amount that will react with one of the hydroxyl groups of the alcohol. Approximately 0.3 to 0.8 mole of aldehyde may be used per mole of alcohol with approximately 0.5 mole to 0.6 mole per mole of polyhydric alcohol preferred. If less aldehyde is used, the products do not have the desired drying properties; if more aldehyde is used, the products have relatively poor resistance to alkalies.

In the preparation of the alkyd resins of this invention the amount of polycarboxylic acid used depends upon such factors as the choice of polyhydric alcohol, the amount of aldehyde present, and the functionality of the polycarboxylic acid. In most cases, however, approximately 0.6 mole to 1.3 moles of dicarboxylic acid is used per mole of polyhydric alcohol. The preferred range is 0.9 mole to 1.1 moles per mole of polyhydric alcohol. It is to be understood that when a tricarboxylic acid or a tetracarboxylic acid is used a proportionately smaller amount of the acid is required.

The amount of monocarboxylic acid used depends upon a number of factors including the functionality of the polyhydric alcohol, the amount of aldehyde, and the amount of dicarboxylic acid used. In general, the amount of monocarboxylic acid used is that amount which is necessary to substantially complete the esterification of the polyhydric alcohol. Ordinarily, approximately 0.2 mole to 1.5 moles of monocarboxylic acid is used per mole of polyhydric alcohol, with approximately 0.5 mole to 1.0 mole per mole of polyhydric alcohol the preferred amount.

Several procedures have been found useful for the preparation of the aldehyde-modified alkyd resins. Preferably the polyhydric alcohol, aldehyde, polycarboxylic compound, and monocarboxylic acid are mixed together and heated at a temperature in the range of 110°–270° C., and preferably in the range of 220°–250° C., until a resin is obtained which has an acid number of less than 30. Alternatively, the polyhydric alcohol, aldehyde, and polycarboxylic compound are heated at a temperature in the range of 110°–220° C., and preferably in the range of 140°–200° C., to form a hard, resinous intermediate product, which may subsequently be heated at approximately 230°–270° C. with a monocarboxylic acid to form an alkyd resin having an acid number of less than 30 and preferably less than 15. In another embodiment of the invention a monoacetal is formed, for example, by the reaction of a polyhydric alcohol with an aldehyde at a temperature between approximately 25° and 150° C. The monoacetal is then heated at a temperature in the range of 110°–270° C., and preferably in the range of 200°–250° C., with a polycarboxylic compound and a monocarboxylic acid to produce the desired alkyd resin. Other suitable methods of preparing these aldehyde-modified alkyd resins will readily suggest themselves to one skilled in the art.

Highly viscous products may be prepared if desired by heating the aldehyde-modified products at a temperature between approximately 70° C. and 200° C. in the presence of a polymerization catalyst, such as boron trifluoride.

The following examples will illustrate the manner in which the present invention may be practiced. It is to be understood, however, that these examples are not to be construed as being limitative but rather are furnished merely for purposes of illustration.

The physical properties of the resins and of the dried films described in these examples were determined by standard test methods. The viscosity of the alkyd resins was measured after dissolving the resin in a solvent to form a solution containing the stated percent by weight of resin. Viscosity was determined in accordance with the Gardner-Holdt procedure using a bubble viscosimeter. This method is fully described in various texts including "Stewart's Scientific Dictionary," 4th Edition, published by Stewart Research Laboratory, Alexandria, Va.

Drying time was determined by casting a film onto a glass plate. Films were set-to-touch when no mark was left by a finger brushing across the film with minimum pressure. When thin, soft paper tissue left no lint after a light touch, the film was considered to be tack free. Foil-dry was reached when a piece of aluminum foil left no mark on the film after a 20 g. weight had been placed on it for 10 seconds. Baked films were obtained by heating a film of the alkyd resin solution which contained no driers at 150° C. for one hour. The hardness of the air-dried and baked films was determined with a Sward Hardness Rocker, and the results are expressed in terms of percentage of the hardness of glass. The Sward Hardness Rocker and its use are described in "Physical and Chemical Examination of Paints, Varnishes, Lacquers and Colors," H. A. Gardner and G. G. Sward, 10th edition, May 1946, distributed by Henry A. Gardner Laboratory Inc.

The hot and cold water resistance were determined by immersing a film of the resin in boiling water for 15 minutes or in water at room temperature for 16 hours and then noting the degree of attack and the time required for the film to recover its original appearance after removal from the boiling water. In the tables that follow "V. Sl." indicates that the film was very slightly affected; "Sl." that the film was slightly affected, and "Cons" that the film was considered affected, and the numbers that follow these abbreviations indicate the number of hours required for the recovery of the film.

The alkali resistance was determined by immersing the dried film cast on a one inch diameter test tube in a 3% aqueous solution of sodium hydroxide or in a 1% solution of "Tide" brand detergent (Proctor and Gamble Co.) and noting the time required for complete destruction of the film. The alkyd resins were pigmented by grinding them with an equal weight of rutile titanium dioxide until a uniform dispersion of the pigment was obtained.

EXAMPLE 1

A series of alkyd resins was prepared by mixing pentaerythritol, phthalic anhydride, paraformaldehyde or 37% formaldehyde solution, tall oil fatty acids, and xylene together at room temperature, heating the mixture to 220° C. in two hours, and maintaining it at this temperature until the product had a low acid number. The resins were cooled and thinned to 50% solids with xylene. The formulations, properties of the alkyd resins, and properties of dried films prepared from these alkyd resins are given in Table I.

EXAMPLE 2

An alkyd resin was prepared by heating a mixture of 136 grams (1 mole) of pentaerythritol, 148 grams (1 mole) of phthalic anhydride, 231 grams (0.8 mole) of tall oil fatty acids, 15 grams (0.5 mole) of paraformaldehyde, and 60 grams of xylene at 245° C. until a product was obtained which had an acid number of 17.1 and which when diluted to a 60% solids solution with xylene had a viscosity of Z-7 and color of 7—. Then 0.01 ml. of boron trifluoride etherate was added to 143 grams of the resin solution and the mixture was heated at 100° C. for 16 hours. The polymerized alkyd resin had a viscosity of Z-10. It dried set-to-touch in 1:35 hours, tack-free in 4:40 hours and foil-dry in 7:45 hours.

EXAMPLE 3

A mixture of 136 grams (1 mole) of pentaerythritol, 141 grams (0.95 mole) of phthalic anhydride, 16.5 grams (0.55 mole) of paraformaldehyde, and 60 grams of xylene was heated together at 190° C. for three hours.

*Table I*

|  | A | B | C | D | E | F | G |
|---|---|---|---|---|---|---|---|
| Formulation (Mole Ratio): | | | | | | | |
| Pentaerythritol | 1 | 1 | 1 | 1 | 1 | | |
| Glycerol | | | | | | 1 | |
| Trimethylolethane | | | | | | | 1 |
| Phthalic Anhydride | 1 | 1 | 0.95 | 0.9 | 0.95 | 1 | 1 |
| Tall Oil Fatty Acids | 0.5 | 0.5 | 0.5 | 0.5 | 0.5 | 0.5 | 0.5 |
| Paraformaldehyde | 0.55 | 0.6 | 0.55 | 0.55 | | | |
| 37% Formaldehyde | | | | | 0.55 | | |
| Properties of Alkyd Resins: | | | | | | | |
| Acid Number | 18.2 | 29.1 | 12.6 | 10 | 14.5 | 8.1 | 9.7 |
| Viscosity (G–H) (50% solution in xylene) | Z+ | W–X | U | V+ | W | U | D |
| Gardner Color (50% solution in xylene) | 6 | 8+ | 7– | 8– | 6– | 5+ | 5 |
| Drying Time (Hours): | | | | | | | |
| Set to Touch | 0:05 | 0:08 | 0:28 | 0:13 | 0:25 | 0:13 | 0:12 |
| Tack Free | 0:27 | 0:20 | 1:40 | 1:40 | 1:45 | 4:52 | 2:49 |
| Foil Dry | 1:57 | 3:27 | 7:45 | 10:10 | 7:30 | 8:07 | 6:51 |
| Properties of Air Dried Film: | | | | | | | |
| Sward Hardness: | | | | | | | |
| 1 Day | 18 | 18 | 14 | 12 | 14 | 10 | 12 |
| 7 Days | 34 | 28 | 26 | 36 | 24 | 30 | 34 |
| 28 Days | 32 | 32 | 32 | 36 | 32 | 28 | 30 |
| Alkali Resistance: | | | | | | | |
| 1% Tide | 16:15 | 2:30 | 11:15 | 3:25 | 13:00 | 1:20 | 2:45 |
| 3% NaOH | 27:55 | 24:00 | 6:30 | 3:50 | 7:00 | 3:00 | 7:00 |
| Properties of Baked Film: | | | | | | | |
| Sward Hardness | 30 | 32 | 34 | 40 | 36 | 22 | 22 |
| Water Resistance: | | | | | | | |
| Hot | Sl. 0:25 | V.Sl. 0:19 | Sl. 1:15 | Sl. 0:45 | Sl. 1:00 | V.Sl. 0:45 | V.Sl. 0:20 |
| Cold | Sl. 0:30 | Sl. 0:17 | Sl. 0:20 | V.Sl. 0:18 | Sl. 0:30 | V.Sl. 0:20 | No Effect |
| Alkali Resistance: | | | | | | | |
| 1% Tide | 84:30 | 93:00 | 90:40 | 42:40 | 88:00 | 68:40 | 113:30 |
| 3% NaOH | 21:45 | 48:00 | 30:15 | 21:45 | 32:20 | 30:15 | 120:00 |
| Properties of Pigmented Film (Air-Dried): | | | | | | | |
| Drying Time (Hours): | | | | | | | |
| Set To Touch | <0:15 | | <0:15 | <0:15 | | <0:15 | <0:30 |
| Tack Free | 0:15 | | 0:15 | 0:15 | | 0:20 | 0:35 |
| Foil Dry | 0:22 | | 0:20 | 6:13 | | 9:35 | 3:18 |
| Sward Hardness: | | | | | | | |
| 1 Day | 22 | | 20 | 16 | | 14 | 14 |
| 7 Days | 40 | | 38 | 32 | | 34 | 32 |
| 28 Days | 44 | | 42 | 38 | | 38 | 38 |
| Properties of Pigmented Film (Baked): | | | | | | | |
| Sward Hardness: | | | | | | | |
| 1 Hour | 40 | | 34 | 32 | | 26 | [1] 22 |
| 24 Hours | 40 | | 32 | 32 | | 26 | [1] 20 |

[1] Baked 0.5 hour at 150° C.

During this time 38 cc. of water was evolved. The intermediate product formed was a hard, clear resin.

To 274 grams of the intermediate product was added 232 grams of linseed oil fatty acids and 60 grams of xylene. The mixture was heated at 245° C. for 4.5 hours to yield an alkyd resin which had a color of 4–5, and acid number of 6.6 and a viscosity (50% solids in V.M. & P. naphtha) of J–K. A film of this resin which contained as driers 0.5% Pb and 0.05% Co as naphthenates dried as follows: set-to-touch, 5 minutes; tack-free, 38 minutes; foil-dry, 1 hour and 53 minutes. The dry film had a Sward hardness of 8 after 1 day, 26 after 7 days, 34 after 14 days, and 28 after 28 days.

EXAMPLE 4

A mixture of 136 grams (1 mole) of pentaerythritol, 163 grams (1.1 moles) of phthalic anhydride, 16.5 grams (0.55 mole) of paraformaldehyde, and 232 grams (0.8 mole) of linseed oil fatty acids was heated at 245° C. for 5.5 hours to form an alkyd resin which had an acid number of 20. A 50% solids solution of the resin in V. M. & P. naphtha had a color of 6 and viscosity of Z–1. After addition of 0.5% Pb and 0.05% Co driers, the resin had the following drying characteristics: set-to-touch, 7 minutes; tack-free, 40 minutes; foil dry, 62 minutes. The Sward hardness of the dry film was 8 after 1 day, 44 after 14 days, and 42 after 21 days.

EXAMPLE 5

A mixture of 816 grams (6 moles) of pentaerythritol, 846 grams (5.7 moles) of phthalic anhydride, 99 grams (3.3 moles) of paraformaldehyde, and 870 grams (3.1 moles) of linseed oil fatty acids was heated with xylene at 200°–210° C. for 5.5 hours to produce an intermediate product which had an acid number of 14.7. Then an additional 522 grams (1.8 moles) of linseed oil fatty acids was added, and the heating was continued at 245° C. for 3 hours. The product had an acid number of 6. A 50% solution of the resin in V. M. & P. naphtha had a color of 6 and a viscosity of W–X. After the addition of 0.5% Pb and 0.05% Co as the naphthenates, the resin had the following drying characteristics: set-to-touch, 5 minutes; tack-free, 35 minutes; foil dry, 80 minutes. After 1 day the Sward hardness of the film was 14, after 7 days it was 28, and after 28 days it was 36.

EXAMPLE 6

A mixture of 136 grams (1 mole) of pentaerythritol, 141 grams (0.95 mole) of phthalic anhydride, 16.5 grams (0.55 mole) of paraformaldehyde, 209 grams (0.72 mole) of linseed oil fatty acids, and 23 grams (0.08 mole) of tung oil fatty acids was heated at 245° C. for 4.25 hours to form an alkyd resin which had an acid number of 11.9. A 50% solids solution of the resin in V. M. & P. naphtha had a color of 9 and viscosity of Z–3. After the addition of 0.5% Pb and 0.05% Co driers, the resin had the following drying characteristics: set-to-touch, 7 minutes; tack-free, 40 minutes; foil-dry, 65 minutes. The Sward hardness of the dry film was 8 after 1 day, 40 after 14 days, and 40 after 21 days.

EXAMPLE 7

Alkyd resins were prepared by mixing pentaerythritol with phthalic anhydride, paraformaldehyde, soybean oil fatty acids and xylene and heating the mixture at 245° C. until the product had an acid number of less than 10. The resins after cooling were thinned to 50% solids with mineral spirits. The formulations and properties of the resins are given in Table II.

Table II

|  | A | | B | |
| --- | --- | --- | --- | --- |
|  | g. | moles | g. | moles |
| Formulation: | | | | |
| Pentaerythritol | 136 | 1 | 136 | 1 |
| Phthalic Anhydride | 141 | 0.95 | 141 | 0.95 |
| Paraformaldehyde | 16.5 | 0.55 | 21 | 0.7 |
| Soybean Oil Fatty Acids | 228 | 0.8 | 228 | 0.8 |
| Alkyd Resin Properties: | | | | |
| Acid Number | 6.3 | | 8.3 | |
| Color (50% mineral spirits solution) | 6+ | | 9+ | |
| Viscosity (50% mineral spirits solution) | Z–2 | | V | |
| Properties of Air Dried Films: | | | | |
| Drying Time (Hours): | | | | |
| Set-to-touch | 1:15 | | 1:33 | |
| Tack-free | 3:05 | | 2:33 | |
| Foil dry | 4:20 | | 23:18 | |
| Sward Hardness (glass-100): | | | | |
| After 1 day | 16 | | 10 | |
| After 7 days | 24 | | 22 | |
| After 28 days | 36 | | 36 | |
| Water Resistance: | | | | |
| Hot | no effect | | no effect | |
| Cold, min | Sl., 15 | | V.Sl., 15 | |
| Alkali Resistance: | | | | |
| 1% Tide, Hours | 168 | | 24 | |
| 3% NaOH, Hours | 160 | | 20 | |
| Properties of Baked Films: | | | | |
| Sward Hardness | 26 | | 26 | |
| Alkali Resistance: | | | | |
| 1% Tide, Hours | 164 | | 72 | |
| 3% NaOH, Hours | 160 | | 96 | |

EXAMPLE 8

A series of alkyd resins was prepared in which 1 mole of pentaerythritol, 0.95 mole of phthalic anhydride, 0.8 mole of fatty acids, and 0.55 mole of an aldehyde were heated together at 245° C. until a product was formed which had an acid number of less than 10. The properties of these resins are given in Table III.

Table III

|  | A | B | C | D | E |
| --- | --- | --- | --- | --- | --- |
| Aldehyde Used | Butyraldehyde | Paraldehyde | Crotonaldehyde | Methacrolein | Benzaldehyde |
| Fatty Acids Used | Soybean oil fatty acids | Soybean oil fatty acids | Soybean oil fatty acids | Soybean oil fatty acids | Linseed oil fatty acids |
| Properties of Alkyd Resin: | | | | | |
| Acid Number of Resin | 4.0 | 8.8 | 6.6 | 7.3 | 8.9 |
| Color (50% in V.M. & P. naphtha) | 5+ | 6+ | 9– | 9+ | 8– |
| Viscosity (50% in V.M. & P. naphtha) | T | R–S | Z–1 to Z–2 | Z–4 | T–U |
| Drying Time (Hours): | | | | | |
| Set-to-touch | 1:30 | 1:35 | 1:25 | 1:25 | -------- |
| Tack free | 2:30 | 2:40 | 4:15 | 3:10 | -------- |
| Foil Dry | 16:22 | 16:22 | 6:08 | 4:55 | -------- |

|  | A | B | C | D | E |
| --- | --- | --- | --- | --- | --- |
| Properties of Air Dried Films: | | | | | |
| Sward Hardness: | | | | | |
| After 1 day | 10 | 10 | 10 | 12 | ---- |
| After 7 days | 28 | 26 | 38 | 34 | ---- |
| After 28 days | 36 | 36 | 46 | 46 | ---- |
| Water Resistance: | | | | | |
| Hot | no effect | no effect | no effect | no effect | ---- |
| Cold, min | Sl., 15 | Sl., 20 | Sl., 20 | V. Sl., 10 | ---- |
| Alkali Resistance: | | | | | |
| 1% Tide, hrs | 240 | 264 | 192 | 24 | ---- |
| 3% NaOH, hrs | 20 | 40 | 48 | 48 | ---- |
| Properties of Baked Films: | | | | | |
| Sward Hardness | 26 | 26 | 28 | 40 | ---- |
| Water Resistance: | | | | | |
| Hot, min | no effect | no effect | V. Sl., 8 | V. Sl., 8 | ---- |
| Alkali Resistance: | | | | | |
| 1% Tide, hrs | 48 | 48 | 48 | 48 | ---- |
| 3% NaOH, hrs | 72 | 72 | 48 | 72 | ---- |

EXAMPLE 9

An alkyd resin was prepared by mixing 136 grams (1 mole) of pentaerythritol with 140.6 grams (0.95 mole) of phthalic anhydride, 16.9 grams (0.55 mole) of paraformaldehyde, and 100 grams (0.5 mole) of lauric acid and then heating the mixture at 220° C. until the product had an acid number of 14.5. This required approximately 1.5 hours. A 50% solution of the product in mineral spirits had a Gardner-Holdt viscosity of Z and a Gardner color of 1+.

When this experiment was repeated using 44.5 grams of 37% methanol-free formaldehyde solution in place of the paraformaldehyde, the product had an acid number of 7, color of 2—, and viscosity of Z–5.

EXAMPLE 10

An alkyd resin may be prepared by mixing 122 grams (1 mole) of trimethylolethane with 148 grams (1 mole) of phthalic anhydride, 173 grams (0.6 mole) of tall oil fatty acids, and 15 grams (0.5 mole) of paraformaldehyde and heating the mixture at 245°–250° C. until it has an acid number of less than 10. The resulting alkyd resin is light in color.

EXAMPLE 11

An alkyd resin may be prepared by mixing 134 grams (1 mole) of trimethylolpropane with 116 grams (1 mole) of maleic anhydride, 173 grams (0.6 mole) of tall oil fatty acids, and 15 grams (0.5 mole) of paraformaldehyde and heating the mixture at 220°–230° C. until it has an acid number of less than 30. The resulting alkyd resin is light in color.

EXAMPLE 12

An aldehyde-modified alkyd resin may be prepared by the following procedure: A formal is prepared by reacting two moles of pentaerythritol with one mole of 37% methanol-free formaldehyde in the presence of a catalytic amount of p-toluene-sulfonic acid. One mole of the resulting pentaerythritol formal is then heated at 220°–230° C. with 1 mole of maleic anhydride and 0.5 mole of benzoic acid until the product has an acid number below 30.

I claim:

1. An alkyd resin which is the polymeric product of the reaction of a polyhydric alcohol selected from the group consisting of pentaerythritol, dipentaerythritol, tripentaerythritol, trimethylolethane, trimethylolpropane, and mixtures thereof; an aldehyde selected from the group consisting of saturated aliphatic aldehydes containing from 1 to 12 carbon atoms, ethylenically unsaturated aliphatic aldehydes containing from 1 to 12 carbon atoms, aromatic aldehydes, aralkyl aldehydes, and alkaryl aldehydes; a polycarboxylic compound selected from the group consisting of saturated aliphatic polycarboxylic acids and saturated aliphatic polycarboxylic acid anhydrides, ethylenically unsaturated aliphatic polycarboxylic acids and ethylenically unsaturated aliphatic polycarboxylic acid anhydrides, aromatic polycarboxylic acids and aromatic polycarboxylic acid anhydrides, and mixtures thereof; and a monocarboxylic acid selected from the group consisting of fatty acids containing from 4 to 22 carbon atoms, benzoic acid, chlorobenzoic acid, salicylic acid, alkylbenzoic acids wherein the alkyl group contains from 1 to 4 carbon atoms, and mixtures thereof in the amounts of 0.3 mole of 0.8 mole of aldehyde, 0.6 mole to 1.3 moles of said polycarboxylic compound, 0.2 mole to 1.5 moles of said monocarboxylic acid per mole of polyhydric alcohol, and 1% to 50% more polyhydric alcohol than the amount required to react with the acids and the aldehyde.

2. The alkyd resin of claim 1 wherein the polyhydric alcohol is pentaerythritol.

3. The alkyd resin of claim 1 wherein the polycarboxylic compound is phthalic anhydride.

4. The alkyd resin of claim 1 wherein the polycarboxylic compound is maleic anhydride.

5. The alkyd resin of claim 1 wherein the aldehyde is paraformaldehyde.

6. The alkyd resin of claim 1 wherein the monocarboxylic acid is linseed oil fatty acids.

7. The alkyd resin of claim 1 wherein the monocarboxylic acid is tall oil fatty acids.

8. An alkyd resin which is the polymeric product of the reaction of a polyhydric alcohol selected from the group consisting of pentaerythritol, dipentaerythritol, tripentaerythritol, trimethylolethane, trimethylolpropane, and mixtures thereof; an aldehyde selected from the group consisting of saturated aliphatic aldehydes containing from 1 to 12 carbon atoms, ethylenically unsaturated aliphatic aldehydes containing from 1 to 12 carbon atoms, aromatic aldehydes, aralkyl aldehydes, and alkaryl aldehydes; a polycarboxylic compound selected from the group consisting of saturated aliphatic polycarboxylic acids and saturated aliphatic polycarboxylic acid anhydrides, ethylenically unsaturated aliphatic polycarboxylic acids and ethylenically unsaturated aliphatic polycarboxylic acid anhydrides, aromatic polycarboxylic acids and aromatic polycarboxylic acid anhydrides, and mixtures thereof; and a monocarboxylic acid selected from the group consisting of fatty acids containing 4 to 22 carbon atoms, benzoic acid, chlorobenzoic acid, salicylic acid, alkylbenzoic acids wherein the alkyl group contains from 1 to 4 carbon atoms, and mixtures thereof in the amounts of 0.5 mole to 0.6 mole of aldehyde, 0.9 mole to 1.1 moles of said polycarboxylic compound, and 0.5 to 1.0 mole of said monocarboxylic acid per mole of polyhydric alcohol and from 1% to 20% more polyhydric alcohol than the amount required to react with the acids and the aldehyde.

9. An alkyd resin which is the polymeric product of the reaction of pentaerythritol with formaldehyde, phthalic anhydride, and a monocarboxylic acid selected from the group consisting of fatty acids containing 4 to 22 carbon atoms, benzoic acid, chlorobenzoic acid, salicyclic acid, alkylbenzoic acids wherein the alkyl group contains from 1 to 4 carbon atoms, and mixtures thereof in the amounts of 0.5 mole to 0.6 mole of formaldehyde, 0.9 mole to 1.1 moles of phthalic anhydride, and 0.5 mole to 1.0 mole of said monocarboxylic acid per mole of pentaerythritol, and from 1% to 20% more pentaerythritol than the amount required to react with the acids and the formaldehyde.

10. An alkyd resin which is the polymeric product of the reaction of pentaerythritol with paraformaldehyde, phthalic anhydride, and linseed oil fatty acids in the amounts of 0.5 mole to 0.6 mole of paraformaldehyde, 0.9 mole to 1.1 moles of phthalic anhydride, and 0.5 mole to 1.0 mole of linseed oil fatty acids per mole of pentaerythritol and from 1% to 20% more pentaerythritol than the amount required to react with the acids and the paraformaldehyde.

11. An alkyd resin which is the polymeric product of the reaction of pentaerythritol with paraformaldehyde, phthalic anhydride, and tall oil fatty acids in the amounts of 0.5 mole to 0.6 mole of paraformaldehyde, 0.9 mole to 1.1 moles of phthalic anhydride and 0.5 mole to 1.0 mole of tall oil fatty acids per mole of pentaerythritol and from 1% to 20% more pentaerythritol than the amount required to react with the acids and the paraformaldehyde.

12. An alkyd resin which is the polymeric product of the reaction of pentaerythritol monoformal with phthalic anhydride and a monocarboxylic acid selected from the group consisting of fatty acids containing 4 to 22 carbon atoms, benzoic acid, chlorobenzoic acid, salicylic acid, alkylbenzoic acids wherein the alkyl group contains from 1 to 4 carbon atoms, and mixtures thereof in the amounts of 0.6 mole to 1.3 moles of phthalic anhydride and 0.2 mole to 1.5 moles of said monocarboxylic acid per mole of pentaerythritol monoformal.

13. The process of producing alkyd resins comprising forming a mixture comprising a polyhydric alcohol selected from the group consisting of pentaerythritol, dipentaerythritol, tripentaerythritol, trimethylolethane, trimethylolpropane, and mixtures thereof; an aldehyde selected from the group consisting of saturated aliphatic aldehydes containing from 1 to 12 carbon atoms, ethylenically unsaturated aliphatic aldehydes containing from 1 to 12 carbon atoms, aromatic aldehydes, aralkyl aldehydes, and alkaryl aldehydes; a polycarboxylic compound selected from the group consisting of saturated aliphatic polycarboxylic acids and saturated aliphatic polycarboxylic acid anhydrides, ethylenically unsaturated aliphatic polycarboxylic acids and ethylenically unsaturated aliphatic polycarboxylic acid anhydrides, aromatic polycarboxylic acids and aromatic polycarboxylic acid anhydrides, and mixtures thereof; and a monocarboxylic acid selected from the group consisting of fatty acids containing 4 to 22 carbon atoms, benzoic acid, chlorobenzoic acid, salicylic acid, alkylbenzoic acids wherein the alkyl group contains from 1 to 4 carbon atoms, and mixtures thereof in the amounts of 0.3 mole to 0.8 mole of aldehyde, 0.6 mole to 1.3 moles of said polycarboxylic compound, and 0.2 mole to 1.5 moles of said monocarboxylic acid per mole of polyhydric alcohol and from 1% to 50% more polyhydric alcohol than the amount required to react with the acids and the aldehyde and thereafter heating said mixture to form an alkyd resin having an acid number of less than 30.

14. The process of producing alkyd resins comprising forming a mixture comprising a polyhydric alcohol selected from the group consisting of pentaerythritol, dipentaerythritol, tripentaerythritol, trimethylolethane, trimethylolpropane, and mixtures thereof; an aldehyde selected from the group consisting of saturated aliphatic aldehydes containing from 1 to 12 carbon atoms, ethylenically unsaturated aliphatic aldehydes containing from 1 to 12 carbon atoms, aromatic aldehydes, aralkyl aldehydes, and alkaryl aldehydes; a polycarboxylic compound selected from the group consisting of saturated aliphatic polycarboxylic acids and saturated aliphatic polycarboxylic acid anhydrides, ethylenically unsaturated aliphatic polycarboxylic acids and ethylenically unsaturated aliphatic polycarboxylic acid anhydrides, aromatic polycarboxylic acids and aromatic polycarboxylic acid anhydrides, and mixtures thereof; and a monocarboxylic acid selected from the group consisting of fatty acids containing 4 to 22 carbon atoms, benzoic acid, chlorobenzoic acid, salicylic acid, alkylbenzoic acids wherein the alkyl group contains from 1 to 4 carbon atoms, and mixtures thereof in the amounts of 0.5 mole to 0.6 mole of aldehyde, 0.9 mole to 1.1 moles of said polycarboxylic compound, and 0.5 mole to 1.0 mole of said monocarboxylic acid per mole of polyhydric alcohol and from 1% to 20% more polyhydric alcohol than the amount required to react with the acids and the aldehyde and thereafter heating said mixture at a temperature between approximately 110° and approximately 270° C. to form an alkyd resin having an acid number of less than 30.

15. The process of producing alkyd resins comprising mixing pentaerythritol with an aldehyde selected from the group consisting of saturated aliphatic aldehydes containing from 1 to 12 carbon atoms, ethylenically unsaturated aliphatic aldehydes containing from 1 to 12 carbon atoms, aromatic aldehydes, aralkyl aldehydes, and alkaryl aldehydes; phthalic anhydride; and a monocarboxylic acid selected from the group consisting of fatty acids containing 4 to 22 carbon atoms, benzoic acid, chlorobenzoic acid, salicylic acid, alkylbenzoic acids wherein the alkyl groups contains from 1 to 4 carbon atoms, and mixtures thereof in the amounts of 0.5 mole to 0.6 mole of aldehyde, 0.9 mole to 1.1 moles of phthalic anhydride, and 0.5 mole to 1.0 mole of said monocarboxylic acid per mole of pentaerythritol and from 1% to 20% more pentaerythritol than the amount required to react with the acids and the aldehyde and thereafter heating said mixture at a temperature between approximately 220° and approximately 250° C. to form an alkyd resin having an acid number of less than 30.

16. The process of claim 15 wherein the monocarboxylic acid is linseed oil fatty acids.

17. The process of claim 15 wherein the monocarboxylic acid is tall oil fatty acids.

18. The process of producing alkyd resins comprising mixing pentaerythritol with paraformaldehyde, phthalic anhydride, and a monocarboxylic acid selected from the group consisting of fatty acids containing 4 to 22 carbon atoms, benzoic acid, chlorobenzoic acid, salicylic acid, alkylbenzoic acids wherein the alkyl group contains from 1 to 4 carbon atoms, and mixtures thereof in the amounts of 0.5 mole to 0.6 mole of paraformaldehyde, 0.9 mole to 1.1 moles of phthalic anhydride, and 0.5 mole to 1.0 mole of said monocarboxylic acid per mole of pentaerythritol and from 1% to 20% more pentaerythritol than the amount required to react with the acids and the paraformaldehyde and thereafter heating said mixture at a temperature between approximately 220° C. and 250° C. to form an alkyd resin having an acid number of less than 30.

19. The process of producing alkyd resins comprising the steps of reacting an aldehyde selected from the group consisting of saturated aliphatic aldehydes containing from 1 to 12 carbon atoms, ethylenically unsaturated aliphatic aldehydes containing from 1 to 12 carbon atoms, aromatic aldehydes, aralkyl aldehydes, and alkaryl aldehydes with a polyhydric alcohol selected from the group consisting of pentaerythritol, dipentaerythritol, tripentaerythritol, trimethylolethane, trimethylolpropane, and mixtures thereof in the amount of 0.3 mole to 0.8 mole of aldehyde per mole of polyhydric alcohol thereby forming a partial acetal of said polyhydric alcohol and thereafter heating said partial acetal with a polycarboxylic compound selected from the group consisting of saturated aliphatic polycarboxylic acids and saturated aliphatic polycarboxylic acid anhydrides, ethylenically unsaturated aliphatic polycarboxylic acids and ethylenically unsaturated aliphatic polycarboxylic acid anhydrides, aromatic polycarboxylic acids and aromatic polycarboxylic acid anhydrides, and mixtures thereof and a monocarboxylic acid selected from the group consisting of fatty acids containing 4 to 22 carbon atoms, benzoic acid, chlorobenzoic acid, salicyclic acid, alkylbenzoic acids wherein the alkyl group contains from 1 to 4 carbon atoms, and mixtures thereof in the amounts of 0.6 mole to 1.3 moles of said polycarboxylic compound and 0.2 mole to 1.5 moles of said monocarboxylic acid per mole of said partial acetal to form an alkyd resin.

20. The process of producing alkyd resins comprising the steps of reacting pentaerythritol with formaldehyde in the amount of 0.3 mole to 0.8 mole of formaldehyde per mole of pentaerythritol thereby forming a partial formal of pentaerythritol and thereafter heating said partial formal with phthalic anhydride and a monocarboxylic acid selected from the group consisting of fatty acids containing 4 to 22 carbon atoms, benzoic acid, chlorobenzoic acid, salicyclic acid, alkylbenzoic acids wherein the alkyl group contains from 1 to 4 carbon atoms, and mixtures thereof in the amounts of 0.6 mole to 1.3 moles of phthalic anhydride and 0.2 mole to 1.5 moles of said monocarboxylic acid per mole of said partial formal to form an alkyd resin.

21. The process of producing alkyd resins comprising the steps of reacting pentaerythritol with paraformaldehyde in the amount of 0.5 mole to 0.6 mole of paraformaldehyde per mole of pentaerythritol thereby forming a partial formal of pentaerythritol and thereafter heating said partial formal at a temperature of approximately 110° C. to approximately 270° C. with phthalic anhydride and linseed oil fatty acids in the amounts of 0.9 mole to 1.1 moles of phthalic anhydride and 0.5 mole to 1.0 mole of linseed oil fatty acids per mole of said partial formal to form an alkyd resin.

22. The process of producing alkyd resins comprising heating a polyhydric alcohol selected from the group consisting of pentaerythritol, dipentaerythritol, tripentaerythritol, trimethylolethane, trimethylolpropane, and mixtures thereof; an aldehyde selected from the group consisting of saturated aliphatic aldehydes containing from 1 to 12 carbon atoms, ethylenically unsaturated aliphatic aldehydes containing from 1 to 12 carbon atoms, aromatic aldehydes, aralkyl aldehydes, and alkaryl aldehydes and a polycarboxylic compound selected from the group consisting of saturated aliphatic polycarboxylic acids and saturated aliphatic polycarboxylic acid anhydrides, ethylenically unsaturated aliphatic polycarboxylic acids and ethylenically unsaturated aliphatic polycarboxylic acid anhydrides, aromatic polycarboxylic acids and aromatic polycarboxylic acid anhydrides and mixtures thereof in the amount of 0.3 mole to 0.8 mole of aldehyde and 0.6 to 1.3 moles of said polycarboxylic compound per mole of polyhydric alcohol to form an intermediate product having free hydroxyl groups and thereafter heating said intermediate product with a monocarboxylic acid selected from the group consisting of fatty acids containing 4 to 22 carbon atoms, benzoic acid, chlorobenzoic acid, salicyclic acid, alkylbenzoic acids wherein the alkyl group contains from 1 to 4 carbon atoms, and mixtures thereof in an amount that will esterify substantially all of the free hydroxyl groups of said intermediate product.

23. The process of producing alkyd resins comprising heating pentaerythritol with an aldehyde selected from the group consisting of saturated aliphatic aldehydes containing from 1 to 12 carbon atoms, ethylenically unsaturated aliphatic aldehydes containing from 1 to 12 carbon atoms, aromatic aldehydes, aralkyl aldehydes,, and alkaryl aldehydes and phthalic anhydride in the amounts of 0.3 mole to 0.8 mole of aldehyde and 0.6 mole to 1.3 moles of phthalic anhydride per mole of pentaerythritol at a temperature between approximately 110° C. and approximately 220° C. to form an intermediate product having free hydroxyl groups and thereafter heating said intermediate product at approximately 230° to 270° C. with a monocarboxylic acid selected from the group consisting of fatty acids containing 4 to 22 carbon atoms, benzoic acid, chlorobenzoic acid, salicyclic acid, alkylbenzoic acids wherein the alkyl group contains from 1 to 4 carbon atoms, and mixtures thereof in an amount that will esterify substantially all of the free hydroxyl groups of said intermediate product.

24. The process of producing alkyd resins comprising heating pentaerythritol with paraformaldehyde and phthalic anyhdride in the amounts of 0.5 mole to 0.6 mole of paraformaldehyde and 0.9 mole to 1.1 moles of phthalic anhydride per mole of pentaerythritol at a temperature between approximately 140° and approximately 200° C. to form an intermediate product having free hydroxyl groups and thereafter heating said intermediate product at a temperature between approximately 230° C. and approximately 270° C. with linseed oil fatty acids in an amount that will esterify substantially all of the free hydroxyl groups of said intermediate product.

25. The process for producing alkyd resins comprising mixing a polyhydric alcohol selected from the group consisting of pentaerythritol, dipentaerythritol, tripentaerythritol, trimethylolethane, trimethylolpropane, and mixtures thereof; an aldehyde selected from the group consisting of saturated aliphatic aldehydes containing from 1 to 12 carbon atoms, ethylenically unsaturated aliphatic aldehydes containing from 1 to 12 carbon atoms, aromatic aldehydes, aralkyl aldehydes, and alkaryl aldehydes; a polycarboxylic compound selected from the group consisting of saturated aliphatic polycarboxylic acids and saturated aliphatic polycarboxylic acid anhydrides, ethylenically unsaturated aliphatic carboxylic acids and ethylenically unsaturated aliphatic polycarboxylic acid anhydrides, aromatic polycarboxylic acids and aromatic polycarboxylic acid anhydrides, and mixtures thereof; and a monocarboxylic acid selected from the group consisting of fatty acids containing 4 to 22 carbon atoms, benzoic acid, chlorobenzoic acid, salicyclic acid, alkylbenzoic acids wherein the alkyl group contains from 1 to 4 carbon atoms, and mixtures thereof in the amounts of 0.3 mole to 0.8 mole of aldehyde, 0.6 mole to 1.3 moles of said polycarboxylic compound, and 0.2 mole to 1.5 moles of said monocarboxylic acid per mole of polyhydric alcohol and from 1% to 50% more polyhydric alcohol than the amount required to react with the acids and the aldehyde, heating said mixture at a temperature between approximately 110° C. and 270° C. to form an alkyd resin having an acid number of less than 30, adding to said alkyd resin an acid polymerization catalyst, and thereafter heating said alkyd resin to obtain a polymerized alkyd resin.

26. The process of claim 25 wherein the alkyd resin is polymerized in the presence of approximately 0.1% by weight of boron trifluoride.

References Cited in the file of this patent

UNITED STATES PATENTS

| | | |
|---|---|---|
| 1,950,468 | Zwilgmeyer | Mar. 13, 1934 |
| 2,056,656 | Ellis | Oct. 6, 1936 |
| 2,376,823 | Scrutchfield | May 22, 1945 |
| 2,895,930 | Yusem | July 21, 1959 |
| 2,907,733 | Greenlee | Oct. 6, 1959 |
| 2,956,964 | Christenson et al. | Oct. 18, 1960 |
| 2,969,338 | Parker | Jan. 24, 1961 |

FOREIGN PATENTS

| | | |
|---|---|---|
| 1,054,444 | Germany | Apr. 9, 1959 |

OTHER REFERENCES

Whitmore: Organic Chemistry, D. Van Nostrand Company, Inc., New York, second edition, May 1951, 1005 pages, page 397 of interest.